United States Patent [19]

Carasso et al.

[11] 4,353,130
[45] Oct. 5, 1982

[54] DEVICE FOR PROCESSING SERIAL INFORMATION WHICH INCLUDES SYNCHRONIZATION WORDS

[75] Inventors: Marino G. Carasso; Jakob G. Nijboer, both of Eindhoven, Netherlands

[73] Assignee: U.S. Philips Corporation, New York, N.Y.

[21] Appl. No.: 191,725

[22] Filed: Sep. 29, 1980

[30] Foreign Application Priority Data

Jun. 16, 1980 [NL] Netherlands .................. 8003477

[51] Int. Cl.³ .......................................... H04L 7/08
[52] U.S. Cl. ................................ 375/114; 370/108; 375/118; 360/51
[58] Field of Search ................ 358/148, 155; 360/51, 360/60; 370/106, 108; 371/36, 42, 46; 375/108, 114, 116, 118

[56] References Cited

U.S. PATENT DOCUMENTS 3,823,266  7/1974  Van Elk et al. ................. 375/108
4,214,124  7/1980  Jarus ............................... 375/114
4,275,466  6/1981  Yamamoto ....................... 360/51

Primary Examiner—Benedict V. Safourek
Attorney, Agent, or Firm—James J. Cannon, Jr.

[57] ABSTRACT

A data stream is received from a medium. This stream consists of synchronization words and data words. The synchronization words are either identical or one the inverse of the other when they are correctly received. Between two synchronization words a fixed number of n data words is present. The information received is always consecutively stored in a buffer memory. The buffer memory has connected to it a detection device for generating an instantaneous synchronization signal by way of a majority decision on at least three correctly received synchronization words. Preferably, the buffer memory is a shift register comprising a data output which is situated approximately ½n data words +½ synchronization word beyond the center of the shift register when n has an even value.

3 Claims, 7 Drawing Figures

DEVICE FOR PROCESSING SERIAL INFORMATION WHICH INCLUDES SYNCHRONIZATION WORDS

BACKGROUND OF THE INVENTION

The invention relates to a device for the synchronized reading of a serial medium which contains digital information in the form of a series of data words of equal lengths and synchronization words (S) which are separated each time by a corresponding number of n data words (D0-D7), said device comprising a detection device for detecting at least one correctly received synchronization word and for signalling a synchronized state in reaction thereto. A device of this kind is known from U.S. Pat. No. 4,001,693. The medium therein is a mobile radio link. The data format (n=3) is shown in FIG. 4 of said Patent Specification. The synchronization procedure is described notably in column 14, lines 31-54. The known device has two states: the synchronization is correct and the synchronization is incorrect. Two kinds of error can occur in a system of this kind. The first category of errors is the changing of the content of a bit, for example, of a synchronization word. A synchronization word can then become unrecognizable as such in given circumstances. The second category of errors is formed by the loss of a bit (of a data word or of a synchronization word) or the addition of a bit. A synchronization word can thus also become unrecognizable. However, the word synchronization may also be lost. The operation of the known device can be easily disturbed by the loss or addition of a data word bit; a comparatively long period of time is then required before the synchronized state is reached again. Particularly in given applications, for example, in home entertainment equipment (storage of video and/or audio information) it is desirable that the synchronization is restored as quickly as possible; however, the requirements imposed as regards correct reception of each data bit per se are somewhat less severe than in a data processing device.

SUMMARY OF THE INVENTION

It is an object of the invention to ensure that in the case of loss or addition of a bit at the most n data words are lost due to a non-synchronized state, without a synchronizing interrogation window being required for the synchronization words. The object in accordance with the invention is realized in that there is provided a buffer memory for the temporary storage of a predetermined amount of said successively read digital information, said detection device being connected to the buffer memory for detecting each time an odd number of k, being at least equal to three, directly successively and correctly received synchronization words which correspond in the non-disturbed condition and which differ from all patterns permissible in data words, by way of a majority decision on these synchronization words, and to generate in reaction thereto an instantaneous synchronization signal which remains valid until it is repealed. Because the synchronization words differ from all patterns permissible in data words, the risk of "false" synchronization is very small. The term "correctly received" is to be understood to mean herein correct as regards shape as well as instant of reception. Contrary to the prior art, the described technique involves a majority decision on a bit group within a single synchronization word. In a simple case, the capacity of the buffer memory merely has to be sufficient, for example, for 2n words + 3 synchronization words. Using a counting device, an actual synchronization signal can be derived from the instantaneous synchronization signal; this counting device may be a ring counter having a cycle duration which corresponds to the word length in order to realize the word synchronization. "Corresponding" may also be "identical". A further possibility consists in that, for example, the synchronization words may be "identical" as well as "mutually inverted", depending on the modulation.

Preferably, said buffer memory is a shift register which can be clocked in synchronism with the information received and which comprises a data output which is situated at such a distance from the data input that $\frac{1}{2}(k+1)$ synchronization words and $\frac{1}{2}n(k-1) \leq j \leq \frac{1}{2}n(k+1)$ data words can be accommodated in the intermediate part of the shift register, the word synchronization being derived from the most recently generated synchronization signal. This offers an attractive realization. Generally, correct signalling concerning the synchronization condition of the bits appearing on said data output will be known. When a bit is lost or added, at the most a number of Max $\{j - \frac{1}{2}n(k-1), \frac{1}{2}n(k+1) - j\}$ words is unsynchronized.

Preferably, j is the integer number nearest to $\frac{1}{2}nk$.

For n even, at the most $\frac{1}{2}n$ data words are received in the unsynchronized condition (on average approximately $\frac{1}{4}n$) in reaction to a single added or lost bit. For n odd, the nearest integer value is chosen for j.

Preferably, said detection device is adapted for the detection of a synchronization word containing an interval without transition which is larger than a maximum permissible interval without transition in the data words. This offers a detection criterion which can be easily implemented.

Preferably, the detection device is adapted for the detection of a series of successively received synchronization words 1, 2, ... k−1, k, the detection device comprising a counter which is started by the detection of the synchronization word least recently received but one and which has a capacity which corresponds to that of n data words plus one synchronization word, the full signal thereof acting as the detection signal of the least recently received synchronization word of said series. Notably when n has a high value, the number of modules required is then reduced: a large number of shift register stages can be dispensed with even when a counter having a limited capacity is used.

BRIEF DESCRIPTION OF THE FIGURES

The invention will be described in detail hereinafter with reference to the accompanying diagrammatic drawing.

DESCRIPTION OF A PREFERRED EMBODIMENT

The preferred embodiment of the device in accordance with the invention is used for digital sound storage in a so-called "compact disc". The technology of the information storage on the disc, the techniques for the following of the data tracks, and the extraction of the information from the track are described, for example, in the prior prepublished Netherlands patent application No. 7802859 (U.S. Ser. No. 925,229, filed Apr. 12, 1979, now abandoned) in the name of Applicant. This previous Application concerns the later storage of data, for example, one sector after the other, when this information is presented. Such an operation takes place in an automated office environment. The present embodiment relates to a prerecorded disc manufactured by means of the techniques customarily used in the record industry. The environment of the invention exhibits two important differences with respect to conventional records: the information density per unit of surface area of the record is much higher and the recording is of a digital type.

Figure 1:
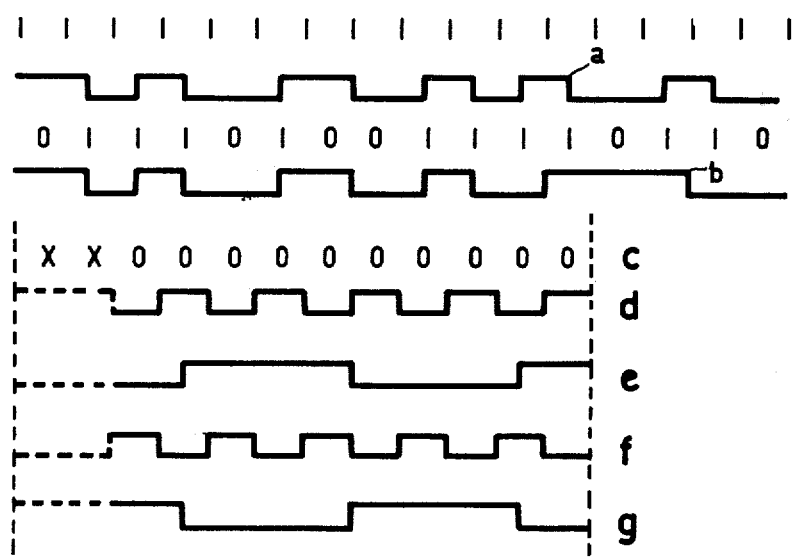
FIG. 1 shows an example of advantageous modulation of the information.

In this respect, FIG. 1 shows an example of a favorable modulation of the information, i.e. at bit level. The medium of the disc is flat, and therein selectively deepened, tangentially extending, strip-like areas are formed. The standard face indicates the binary value "0"; the recessed level denotes the value "1" of the signal or vice versa. Reading is effected in an optical manner. (a) indicates the modulation pattern of a so-called normal Miller modulation. The boundaries of the bit cells are denoted by vertical strokes and the information value is plotted on the next lower line. The modulation rule is as follows: a logic "1" produces a transition in the center of the bit cell. A logic "0" produces a transition at the end of a bit cell, provided that the next bit cell also contains a "0". FIG. 1a thus shows the presence and absence of a recess in the disc.

(b) indicates a modified Miller modulation, as described detail in Netherlands patent appliction No. 80 . . . (U.S. Ser. No. 179,338, filed Aug. 18, 1980), filed in the same day as the present Application and titled "Method of coding data bits on a recording medium, arrangement for putting the method into effect, and recording medium having an information structure," said Patent Application being incorporated herein by way of reference. This modulation substantially corresponds to that of FIG. 1a, the difference being: the transitions of the last two "1" bits of a direct succession of an even number (2, 4, 6 . . . ) of logic "1" bits are suppressed and replaced by a single transition at the boundary between these last two "1" bits. The number of transitions is thus reduced. Furthermore, the share of low-frequency components in the signal spectrum is strongly reduced. The smallest distance between two successive signal transitions on line 1a equals one bit cell, and the largest distance equals two bit cells. On the line b the smallest distance again equals one bit cell, but the largest distance equals three bit cells. The latter occurs, for example, in the case 0110110. The embodiment utilizes the second form of modulation. FIG. 1b shows the relevant data words. The modulation of the synchronization words will be described hereinafter (lines c to g). It is to be noted that in the foregoing one data bit is present per bit cell which is translated into two code bits, because a signal transition can occur at the boundary as well as in the center of the bit cell.

Figure 2:
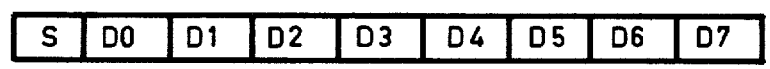
FIG. 2 shows a format of the information.

FIG. 2 shows the format of the information. First there is a synchronization word S of 12 bits. Subsequently, there is a series of eight data words. Each of these data words contains 21 bits. During the formation of the data words, one unit of acoustic information is incorporated in 14 data bits. Subsequently, 7 parity bits are added thereto to create a given error correction facility. The invention does not relate to the error correction mechanism within a single data word. The interval shown in FIG. 2 is referred to as a "frame" having a length of $8 \times 21 + 12 = 180$ bit cells. Thus, on the record a series of such successive "frames" are present along a track. On the other hand, other formats and word lengths may also be advantageous in given circumstances. The invention can also be used for other information media, such as a data link.

Figure 3A:
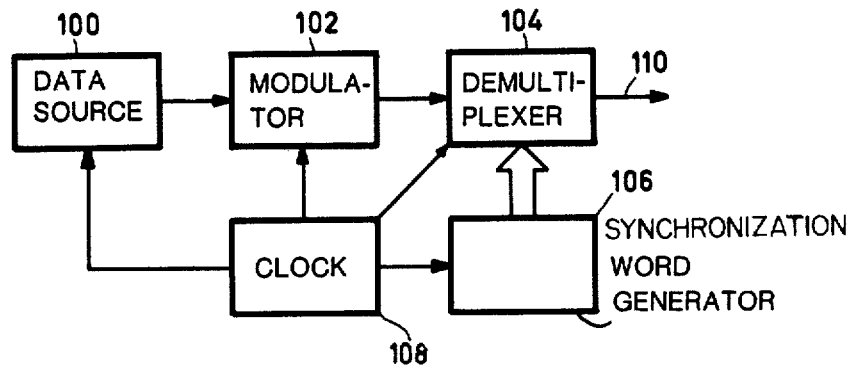
FIGS. 3a, 3b show block diagrams of a device for forming the information for the storage.
Figure 3B:
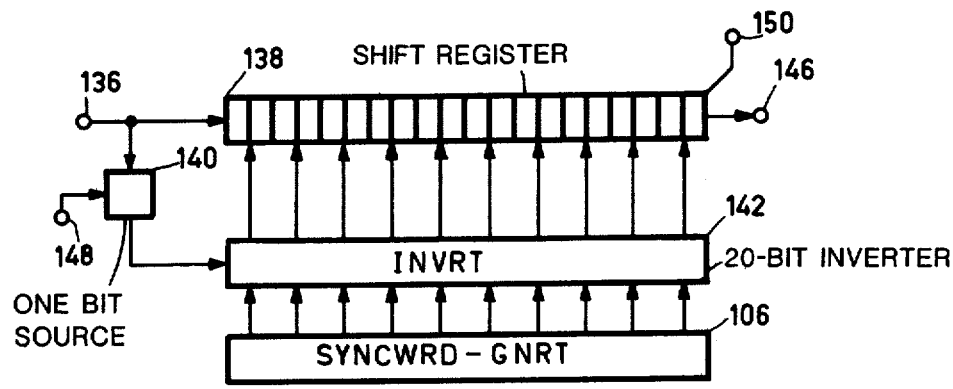

For the storage, the information bits of the data words are modulated as described with reference to FIG. 1, line b. FIG. 1, line c shows the content of a pseudo-synchronization word S of FIG. 2 such as added to the information of the data words for the modulation thereof. It consists of two function bits xx which may have a value in order to form control information, and 10 logic "0" bits. The result of the modulation of the pseudo-synchronization word is shown in FIG. 1, lines d, f. Each of these two lines is the inverse of the other, the ultimate result being dependent of the values of the two function bits and of the signal state at the beginning of the pseudo-synchronization word. For the sake of brevity, the effect and the operation of the function bits will not be described, and the FIG. 1 lines e, g will be described at a later stage. In this respect, FIG. 3a gives an overall impression of the formation of the information for the storage on the master disc. Block 100 denotes a data source: under the control of clock signals from a clock 108, this source supplies a serial data stream. This stream is already organized according to data words plus pseudo-synchronization words and is generated, for example, as if the memory locations of a random access memory (RAM) were successively read, followed by parallel/series conversion. The serial stream of data bits may have an arbitrary information content. Element 102 is a modulator. Therein, the stream of data bits plus the pseudo-synchronization words are modulated according to the rules given in FIG. 1, line b, in order to improve the suitability for storage on the storage medium. The modulation is synchronized again by clock signals from the clock 108. Thus, each time n words are modulated in order to form words which are referred to as "data words" hereinafter; thus, each of these data words consists of 21 bit cells of two code bits each. A series of n (8) data words is followed by the modulation result of a pseudo-synchronization word: 12 bit cells of two code bits each. Element 104 is a demultiplexer comprising two inputs and one output. A more detailed diagram of the demultiplexer 104 is shown in FIG. 3b. The demultiplexer comprises a 20-bit shift register 138 with an input 136 and an output 146. The actual synchronization word is formed by means of a synchronization word generator 106 which contains a 20-bit pattern, for example, like the continuous part of FIG. 1, line e; when the pseudo-synchronization word has the configuration of FIG. 1, line d, it is replaced by the "real" synchronization word according to FIG. 1, line e. When the pseudo-synchronization word has the configuration of FIG. 1, line f, it is replaced by the "real" synchronization word according to FIG. 1, line g. Notably the last signal values of pseudo-synchronization words and "real" synchronization words are always the same in order to satisfy the modulation requirements. In order to enable inversion of the word stored in element 106, element 142 is inserted; this element is a 20-bit, selectively activatable, parallel operating inverter. This inverter is activated by a data bit stored in bit stage 140 and derived from the pseudo-synchronization word; it may thus be the bit which is shown at the extreme right in FIG. 1d, f. The storage in bit stage 140 takes place once per frame under the control of an activation signal on input 148. Similarly, the shift register 138 is activated; per frame it receives 2×180 shift pulses, so that the code bits are shifted each time one half data bit cell further and appear on the output 146 after having passed through the shift register, and also once per frame on input 150 in order to take over the parallel information from the synchronization word generator 106. The control pulse on the terminal 150 appears between two successive shift pulses if the pseudo-synchronization word (without the said function bits "xx") is completely present in the shift register 138. The control pulses on the inputs 148, 150 can be formed by the decoding of a counting position of a counter which receives the shift pulses from the clock 108. The synchronization word is thus each time introduced in parallel in the frame in a predetermined manner the local pseudo-synchronization word being erased. Thus, the synchronization word is not applied via the modulator 102; it does not comply with the code restrictions of the modified Miller code. It notably comprises two intervals without transition, each interval having a length of $3\frac{1}{2}$ bit cells, which enables unambiguous recognition.

Figure 4:
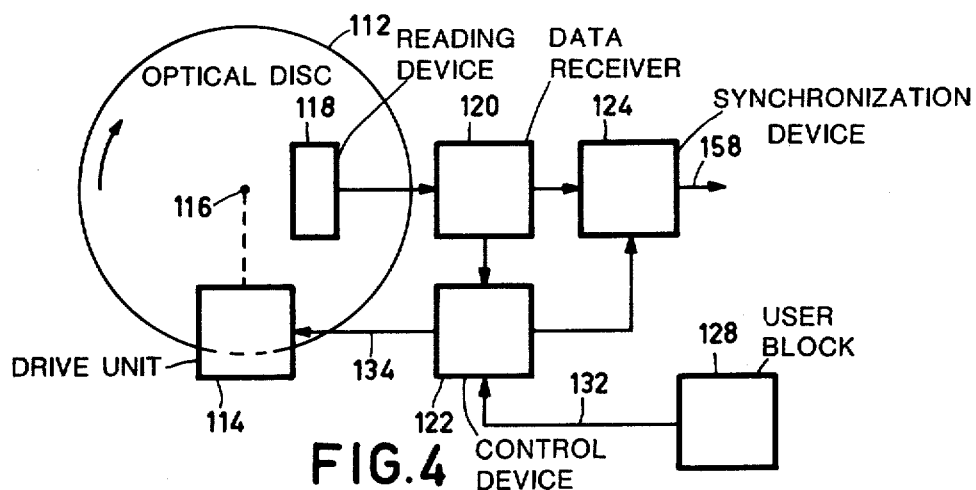
FIG. 4 shows a general block diagram of a reading device for an audio disc.

FIG. 4 shows a block diagram of a reading device for the audio disc. The disc 112 is driven around its axis (116) by a variable drive unit 114. The information track on the disc is read by a read/focus/adjusting device 118. Element 120 receives the information bits read; this element inter alia includes a clock extraction device; this element furthermore forms, by equalizaton in order to compensate for irregularities in the transfer characteristic of the read operation and for asymmetry in the signal formed by the read operation, the digital signal which is suitable for further processing. The clock signals thus formed are applied to the control device 122 which receives a clock signal having the desired clock pulse frequency on line 132 in order to form a control signal for the drive device 114 on line 134. The clock signal on the line 132 is generated by the user block 128 which comprises a self-oscillating element having the desired frequency. The elements mentioned thus far do not form part of the invention. The stream of data bits is applied to the synchronization device 124 in which the word synchronization is realized.

Figure 5:
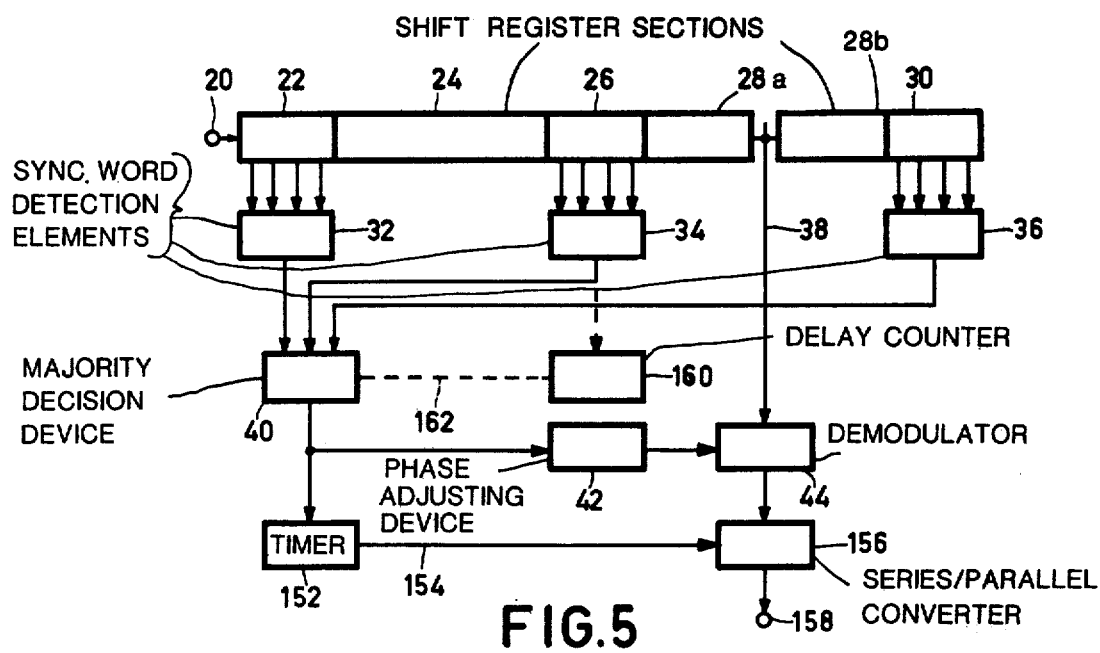
FIG. 5 shows block diagram of a synchronization device.

FIG. 5 shows a block diagram of a device for genreating a synchronization signal. The information, containing data (data words) as well as synchronization information (synchronization words), arrives on an input 20. In this example, the format of the information is no shown to scale. The device comprises a shift register which includes successive sections 22, 24, 26, 28, 30. The sections 22, 26, 30 have a capacity which is sufficient for accommodating one synchronization word, i.e. each time 12 bit cells of two code bits each. The previously described function bits "xx" are positioned at the beginning of a synchronization word: they need not fit in the section 30, because they have no further function for the synchronization described here. The sections 24, 28 both have a capacity for 8 data words with each time two code bits per information bit cell. The shift register comprises an information output at the line 38 and is clocked by an output signal of the element 122 in FIG. 4. The section 28 is divided into two equal halves in the manner shown. At the sections 22, 26, 30, the shift register is provided with a set of tappings for detecting the presence of a synchronization word by the elements 32, 34, 36; these synchronization words may be shaped as shown in FIG. 1, line e or g. The two function bits "xx" need not be taken into account for this detection. The detection can be advantageously performed in that a synchronization word comprises two sets of seven successive, mutually equal code bits. The two sets of these mutually equal code bits at the beginning and at the end of the synchronization word can be taken into account for the detection or not. If one of the detection elements 32, 34, 36 detects such a synchronization word, it supplies a "1" signal; otherwise it supplies a "0". These signals are applied to the majority decision device 40; this device supplies a logic "1" if at least two of the three detection elements 32, 34, 36 detect a synchronization word. The synchronization signal ("1") thus formed is applied to the phase adjusting device 42. This device determines whether the code bit received on the line 38 is the first or the second bit of an information bit cell: the synchronization signal indicates the information present on the line 38 at this instant as the first code bit of a data word. The phase adjusting device, therefore, supplies the even/odd signal to the demodulator 44 which forms one data bit for every two code bits received. The synchronization signal from the majority decision device 40 is also applied to the timer 152 which comprises a counter which is set to a starting position by the synchronization signal, subsequently indicates 4 times, each time after 21 bit cells, the beginning of a next word (3 times a data word, followed by a synchronization word), subsequently after 12 bit cells, then 8 times after each time 21 bit cells, then after 12 bit cells again, etc., until the timer is reset to the starting position by the synchronization signal. If no further synchronization words are detected by the device 40, this counter can circulate an arbitrary number of times. The synchronization is then maintained, even if disturbances occur in the synchronization words, for as long as no bits are lost or added. The "starting signals" for the data words (and synchronization words, as the case may be) are formed, for example, by a decoder which is connected to the counter and whose output forms the output of the timer 152: "starting" signals then appear on the line 154. Element 156 is series/parallel converter. It receives the data bits and the bits of the synchronization words from the demodulator 44 and comprises a 21-bit shift register. In reaction to a signal on the line 154, the data stored appears in parallel on the output 158 for further processing. It is alternatively possible for the "starting" signals of the device 152 to appear only if the series/parallel converter 156 contains a data word: the synchronization words on the output 158 are then no longer present. The further processing of the latter signals is not shown for the sake of brevity. The described organization can be adapted to other lengths of data/synchronization words. The number of data words between two synchronization words may be odd; preferably, each of the parts of the section 28 of the input shift register can accommodate an integer number of data words. If each information bit cell contains only one code bit, the element 42 can be dispensed with. The control by the clock pulses is not shown in FIG. 5. The elements 152, 156 each time receive one clock pulse per information bit cell, and the elements 22 to 30, 42 and 44 receive each time one clock pulse per code bit, so two clock pulses per bit cell. Similarly, the detection elements 32, 34, 36 and the majority decision device 40 can receive a synchronizing clock pulse (2×per information bit cell).

The synchronization device can alternatively be realized as follows. The output signal of the detection element 34 is applied as a reset signal to a delay counter 160. When this counter reaches a position, while counting the clock pulses, which corresponds to the length of a frame (8 data words plus 1 synchronization word) it outputs a signal on line 162 to the majority device 40. The latter signal takes the place of the output signal of the detection element 36. In that case the last part of the shift register section 28 (at the right in the Figure), the shift register section 30 and the element 36 can be dispensed with. This can result in a saving of materials notably in the case of long frames. The synchronization device 124 of FIG. 4 has thus been implemented.

The device shown in FIG. 5 can implement a majority decision on five words in a similar manner.

Figure 6:
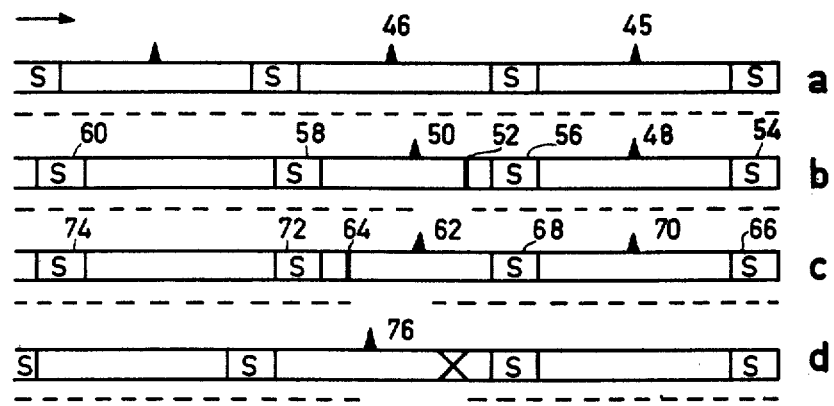
FIG. 6 shows the correctly and incorrectly synchronized conditions.

FIG. 6 shows a pattern of data and synchronization information and illustrates the correct and incorrect synchronization. FIG. 6a shows a case without errors: the letters "s" indicate each time the location of a synchronization word. When the three extreme right synchronization words in the Figure are detected, the position of the terminal line 38 in FIG. 5 is denoted by the extreme right arrow head (45). Under the control of the clock pulses, the information present between the arrow heads 45 and 46 is successively presented on the output 28. When the next three synchronization words are detected, the position of the line 38 is given by the arrow head 46. All information is then synchronously detected at the word level, as indicated by the broken line in FIG. 6a. In FIG. 6b, an information element (one or more bits) has been lost at the indication 52; this is indicated by a heavy stroke. The synchronization at the word level is then correct as from the arrow head 48 and possibly in front thereof, until the location of the loss; this is because two correct synchronization words are detected (the words 54 and 56) at the instant at which the position of the terminal 38 corresponds to the arrow head 48. When the position of the terminal 38 is indicated by the arrow head 50, two synchronization words are correctly detected again (the words 58 and 60) and the synchronization is correct again as from the arrow head 50. It is only the part between the area of loss 52 and the arrow head 50 where the synchronization is not correct; this is indicated by the absence of the broken line at this area.

FIG. 6c shows a loss in the second half of a data interval (at 64). When the output 38 is situated at the area of the arrow head 70, two synchronization words are correctly detected. When the output 38 is situated at the arrow head 62, the two synchronization words 72 and 74 are correctly detected. Thus, incorrect synchronization occurs between the arrow head 62 and the loss 64. FIG. 6d shows an added data element: this is denoted by a cross. As from this addition until the arrow head 76 the synchronization is then incorrect.

Various modifications are possible within the scope of the present invention. For example, the modulation rule may be different. The majority decision may also be performed on five words. The output 38 need not be situated exactly halfway between the two tappings for the detection of synchronization words (for example, when there is an odd number of data words per frame). Furthermore, the majority decision may also be taken in a different manner in that a majority decision is performed on corresponding bits of different synchronization words, and it is checked whether the assembly of majority decisions forms a synchronization word or corresponds thereto with sufficient accuracy. In the latter case all synchronization words must be mutually equal.

What is claimed is:

1. A device for the synchronized reading of a serial medium which present a series of synchronization words (S), wherein each pair of successive synchronization words is separated by a fixed number of n data words (D0 ... D7), the synchronization words in undisturbed condition having mutually corresponding bit patterns which differ from the set of allowable data word bit patterns, said device comprising:
  a. an input (20) for interfacing to said medium;
  b. a serial buffer memory fed by said input and comprising:
  b1. a first section (22) for accommodating a synchronization word:
  b2. an odd number of m (m=1,3 ... ) serial modules, each module consisting of a second section (24) for accommodating said fixed number of n data words and a third section (26) for accommodating a further synchronization word;
  b3. an output section (28a) for accommodating a number of p data words, wherein p is the closest integer to the value of n/2, and serially presenting the buffered data words and synchronization words to its output (38);
  b4. additional memorizing means (28b, 30) for memorizing the occurrence of a synchronization word at said output during an interval corresponding to the length of (n−p) data words plus one synchronization word;
  c. majority means (32, 34, 36, 40) connected to respective outputs of said first section, said odd number of third sections and said memorizing means for generating a majority signal upon detection of (k+1)/2 synchronization word signals;
  d. timing means (152) having a control input connected to said majority means for generating a series-to-parallel control signal for a conversion device (156) fed by said output.

2. A device as claimed in claim 1, wherein said majority means comprises a detector for detecting a synchronization word as containing a time interval without a signal value transition that is longer than the maximum allowable value of such interval in the data words.

3. A device as claimed in claim 1, wherein said memorizing means comprises a delay counter (160) having an input means (34) for detecting a synchronization word in the final one of said m modules, having a delay corresponding to the duration of n data words and one synchronization word, and wherein said majority device decides on (m+1) actually detected synchronization words and an output signal from said delay counter.

* * * * *